Jan. 9, 1968

J. W. CRANE ET AL 3,362,142

HAY PELLETER

Filed April 17, 1964

INVENTORS
Jack W. Crane
John P. Tarbox
BY Walter V. Wright

Jan. 9, 1968   J. W. CRANE ET AL   3,362,142
HAY PELLETER
Filed April 17, 1964   5 Sheets-Sheet 3

INVENTORS
Jack W. Crane
John P. Tarbox
BY Walter V. Wright

Jan. 9, 1968 J. W. CRANE ET AL 3,362,142
HAY PELLETER
Filed April 17, 1964 5 Sheets-Sheet 4

INVENTORS
Jack W. Crane
John P. Tarbox
BY Walter V. Wright

INVENTORS
Jack W. Crane
John P. Tarbox
BY Walter V. Wright

United States Patent Office 3,362,142
Patented Jan. 9, 1968

3,362,142
HAY PELLETER
Jack W. Crane, New Holland, and John P. Tarbox,
Philadelphia, Pa., assignors to Sperry Rand Corporation, New Holland, Pa., a corporation of Delaware
Filed Apr. 17, 1964, Ser. No. 360,495
16 Claims. (Cl. 56—1)

The machine of our invention is of that general type in which hay is wrapped turn by turn into an elongating hay roll of pellet diameter, the wrapped hay roll is advanced and elongated on the axis of its formation as it is formed, and is cut at its advancing end into pellets of relatively small axial dimension, both pellet dimensions being comfortably acceptable in the mouths of the animals to whom they are to be fed.

We have had two outstanding aims in inventing this machine. First is the elimination of the extremely low efficiency which has hitherto characterized such machines when they are compared with pelleting machines of the best of other types, and the achievement of marked decrease in the horsepower per ton required to operate them. The second is the attainment of notable improvements in the quality of the product, improvements which among other things assure users of adequate density at desired moisture content and enduring geometric form.

Analysis of the reasons for these great shortcomings reveal them to reside in largest part: (a) in irregularities in the geometry of the feeding and forming operations, (b) in the non-uniformity of quantities and diversities of densities of the material fed to the pellet forming units of said machines, (c) irregularities of turn lengths and densities in the forming and firming operations, (d) the presence of overmuch slack to be taken up in the turns of the wrappings in hay roll interiors during their firming and stabilizing, (e) failure to remove the slackness brought into the outer periphery of the hay roll during firming and stabilizing by the necessary radial compressive indentations of the firming rolls themselves, and (f) inefficient and irregular pellet severing from the firmed and stabilized rolls. Beside their being at the root of the unnecessarily high horsepower per ton, these inadequacies are believed by us to have been largely if not wholly responsible for the relatively low quality of the product and its low endurance factors.

In achieving our invention we make use of both method and means. As in some prior machines we arrange a bank of hay roll forming units in rectilinear alignment in an horizontal plane, though we may give the bank yet other geometric arrangements. In feeding and distributing the hay to the bank, hay received by the machine in irregular form and of varying densities (as for example received from a pick up from a windrow) is first consolidated into a meterable mass of regular geometric form and metered in this form. As conveyed to the bank this consolidated and metered mass is subjected during the conveying to substantially uniform redistribution between the pellet forming units of the bank governed by the metering operation. This uniformly distributed mass before the bank then has its density substantially uniformly increased. Thus condensed and thinned the mass before the bank is cut into ribbons of equal width one for each hay roll forming unit, and the ribbons are individually fed to the respective units. Such control of uniformity of feeding insures substantially uniform work for each pelleting unit and contributes to the uniformity of the product. Entering the units the ribbons are progressed axially while being wrapped and given a conical form whose base is of a diameter approximating that of the ultimate pellet, further progressed, elongated and firmed in cylindrical form approximately of the same diameter as the base of the conical form. This conical geometry of forming is ideal for greatest efficiency of hay roll formation when hay rolls are progressed while being formed and are wrapped turn by turn. The length of the interior turns of the hay roll is maintained substantially constant during the entire progression. Thus there exists little if any slack in the interior turns to be taken up in the firming operation. This operation therefore not only takes less power but may require it for a shorter time. Indentations of outer hay roll periphery made by the rolls create slack in the outer turns. Such slack created by preceding rolls we take up by operating certain if not all of the succeeding rolls at progressively greater peripheral speeds than the preceding rolls. This also saves power. Severing the pellets is achieved by engaging the hay roll with but one severing blade during the time required for the complete severing of a pellet, so saving pellet severing power. This single blade we always engage at the same determinate distance from the outermost end of the progressing hay roll, thus insuring uniformity of pellet dimensions.

The means used in carrying out the method can best be described with reference to the accompanying drawings of the best of the embodiments known to us at the present time.

Referring to the drawings.

Figure 7:
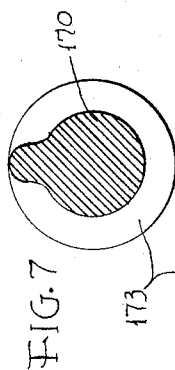
Figure 9:
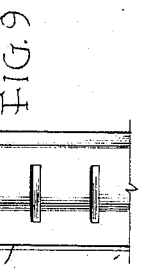
Figure 8:
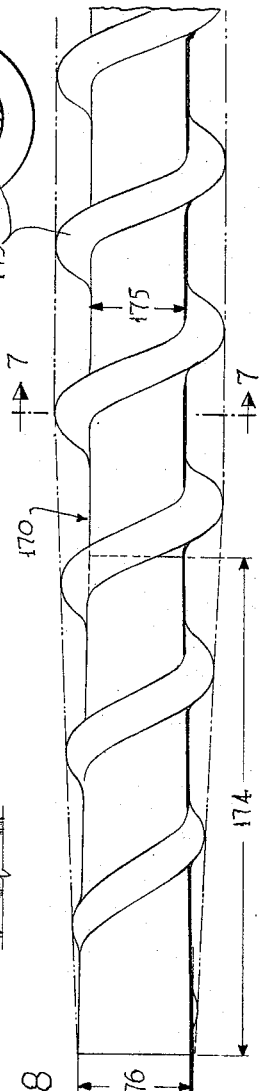
Figure 3:
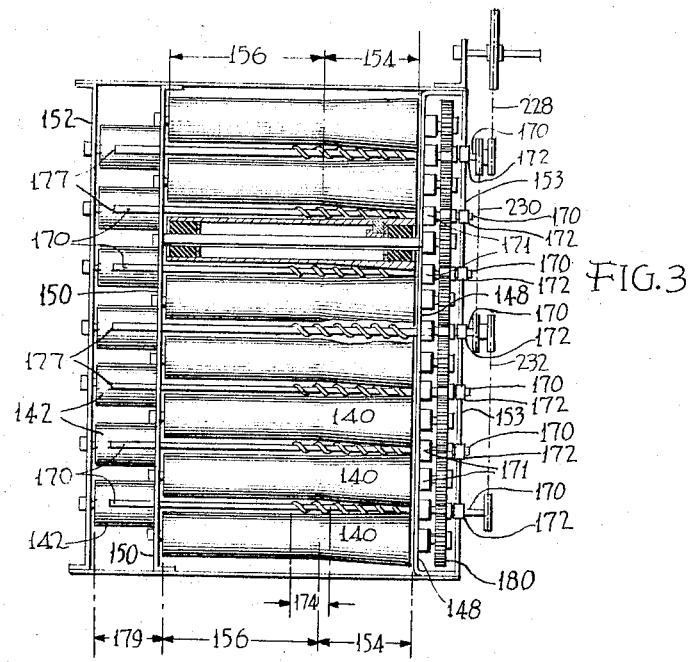
Figure 15:
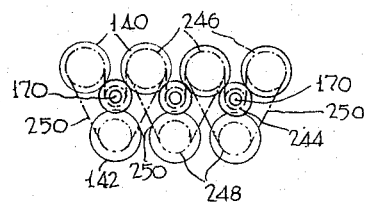
Figure 4:
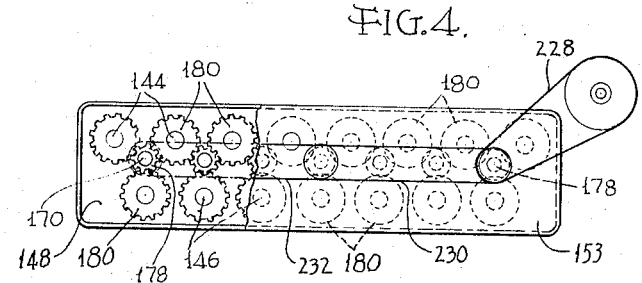
Figure 6:
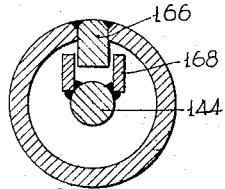
Figure 5:
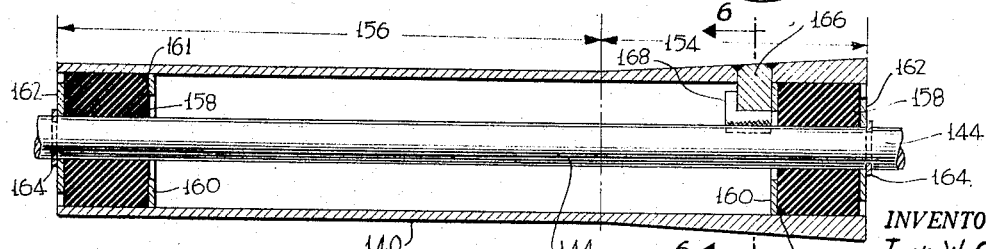
Figure 10:
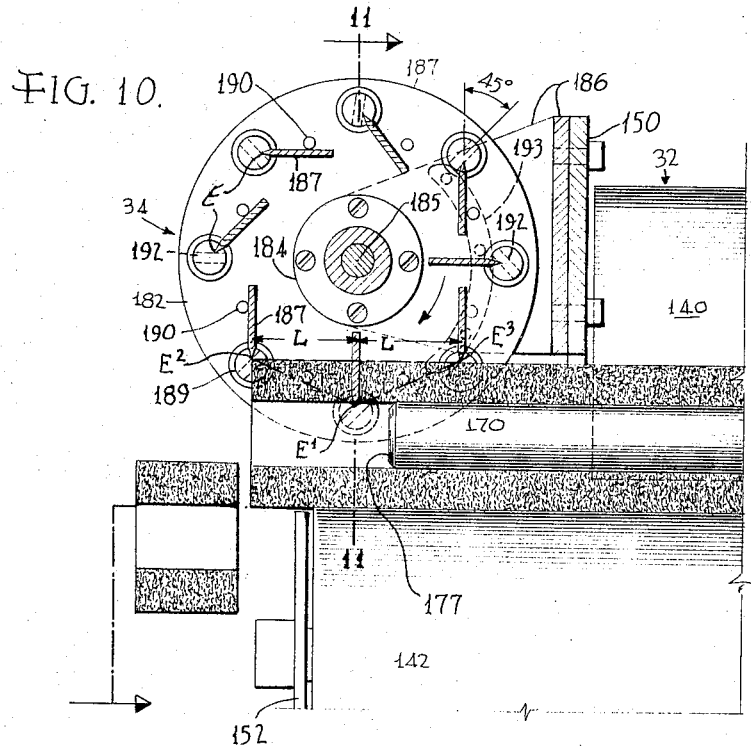
Figure 11:
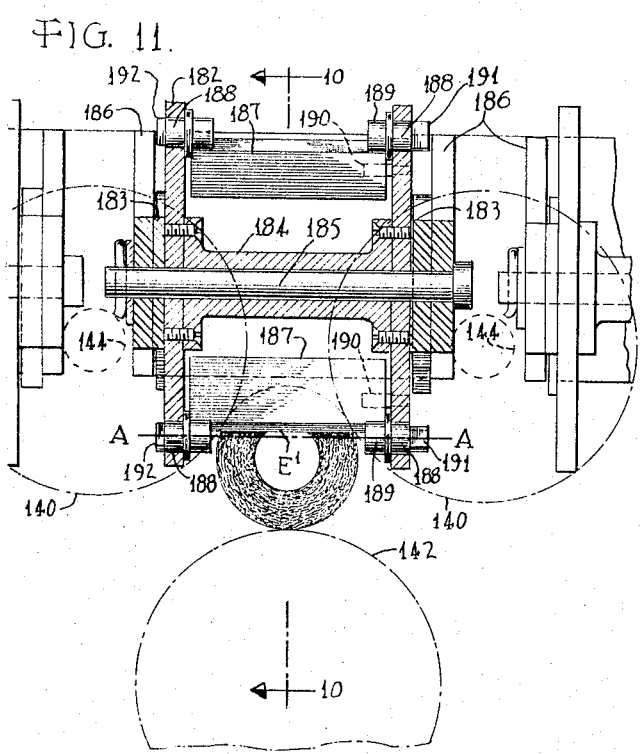
Figure 12:
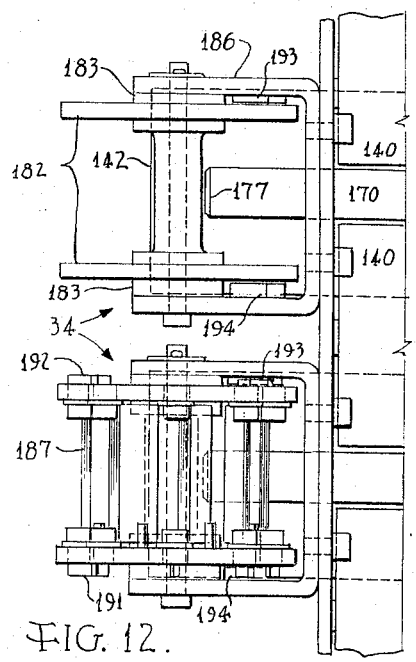
Figures 13, 14:
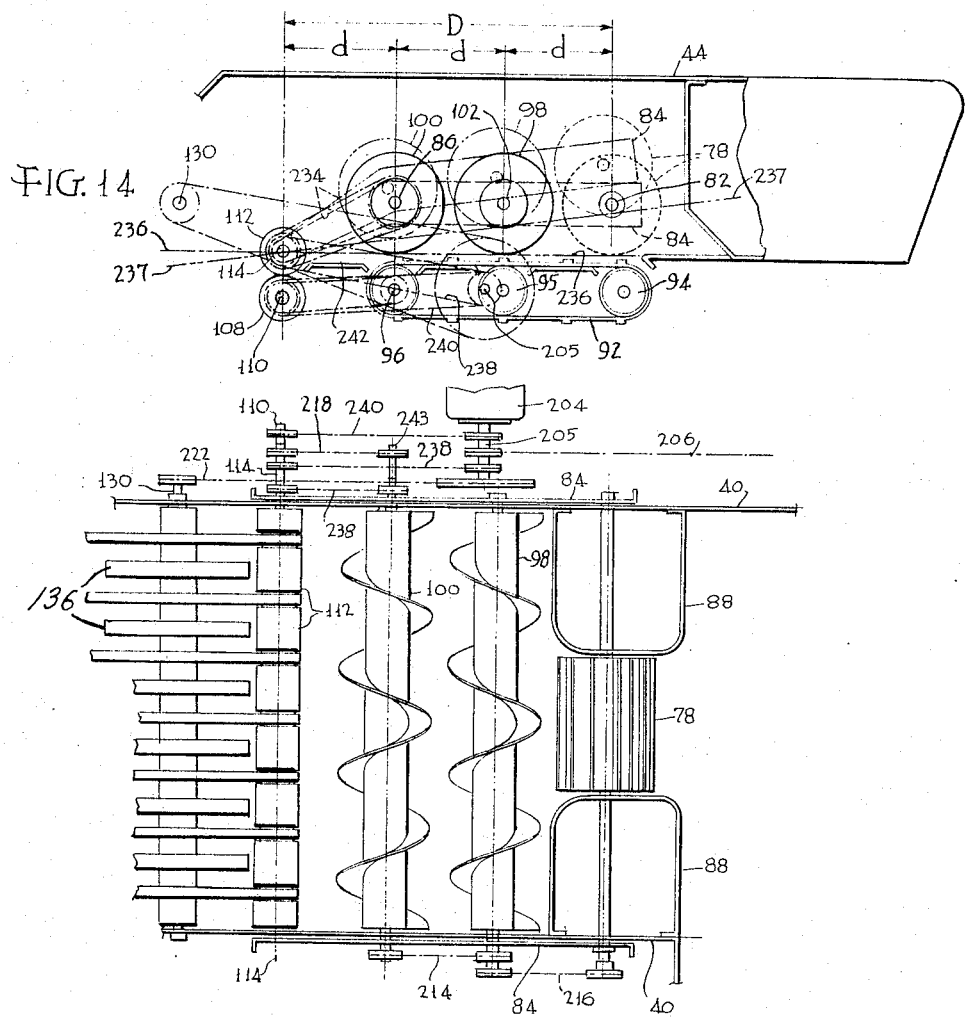

FIG. 3 is a top plan view of the bank of pelleting units which we employ. One of the top rolls, the third from the left is shown in cross section in order the better to show its relationship to the adjoining elements of the unit. In this view is also shown the driving gearing of the elements of the bank. The pellet severing devices of the bank have been omitted in order to show the relationships of the discharge ends of the elements of the hay forming and firming rolls to the pelleting units;

FIG. 4 is a right side elevation of FIG. 3 having the rearmost portion of the drive gearing housing broken away;

FIG. 5 is a detailed enlargement of the roll cross section which appears in FIG. 3;

FIG. 6 is a cross section of this roll taken on line 6—6 of FIG. 5 looking in the direction indicated by the arrows;

FIG. 7 is a transverse cross section of the front portion of one of the wrapping spindles which co-act with the rolls of the bank, taken on line 7—7 of FIG. 8;

FIG. 8 is a side elevation of an intermediate portion of one of the hay wrapping spindles;

FIG. 9 is a detail of a portion of the transversely extending apron which underlies individual feeding conveyors associated with the respective pelleting units of the bank;

FIG. 10 is a vertical section taken on the axis of a wrapping spindle depicting especially the exacting geometry of pellet severing from the roll;

FIG. 11 is a transaxial cross section taken on the line 11—11 of FIG. 10;

FIG. 12 is a top plan view (on a reduced scale) showing the pellet severing mechanism and its detailed relationship to the other elements of a pelleting unit, and particularly the relationship to the hay roll formed by the unit and the wrapping spindle and rolls of the unit;

FIGS. 13 and 14 are respectively a top plan view and right hand side elevation of a modified form of the hay metering and redistributing feeding mechanism of the machine; and FIG. 15 is a small diagrammatic illustration of a chain drive gearing which may be substituted for the gearing appearing in FIGS. 3 and 4, but showing in addition the means for varying the peripheral velocities of the several rolls which comprise the unit.

Figure 1:
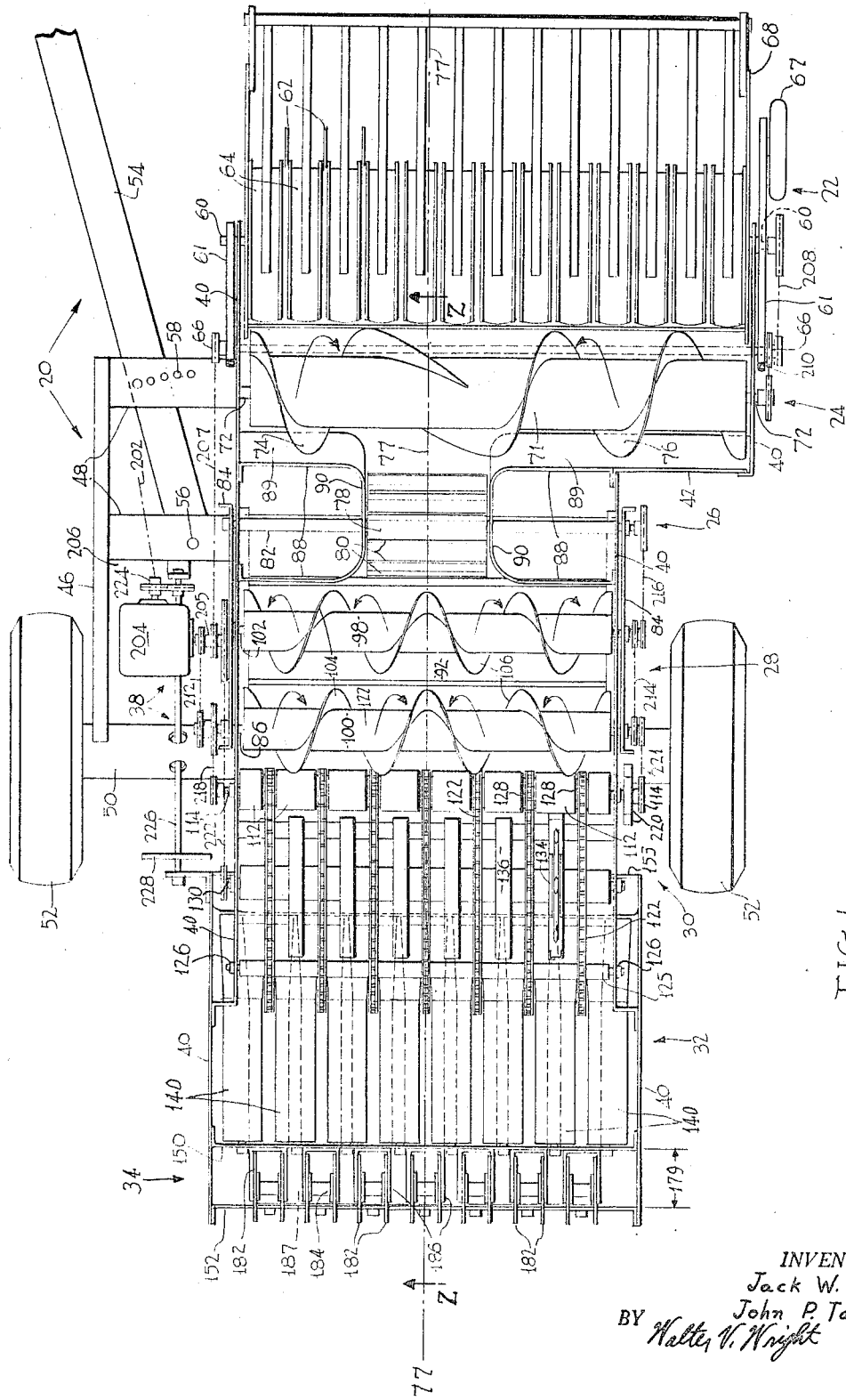
FIG. 1 is a top plan view of the machine with portions broken away to show the interior mechanisms.
Figure 2:
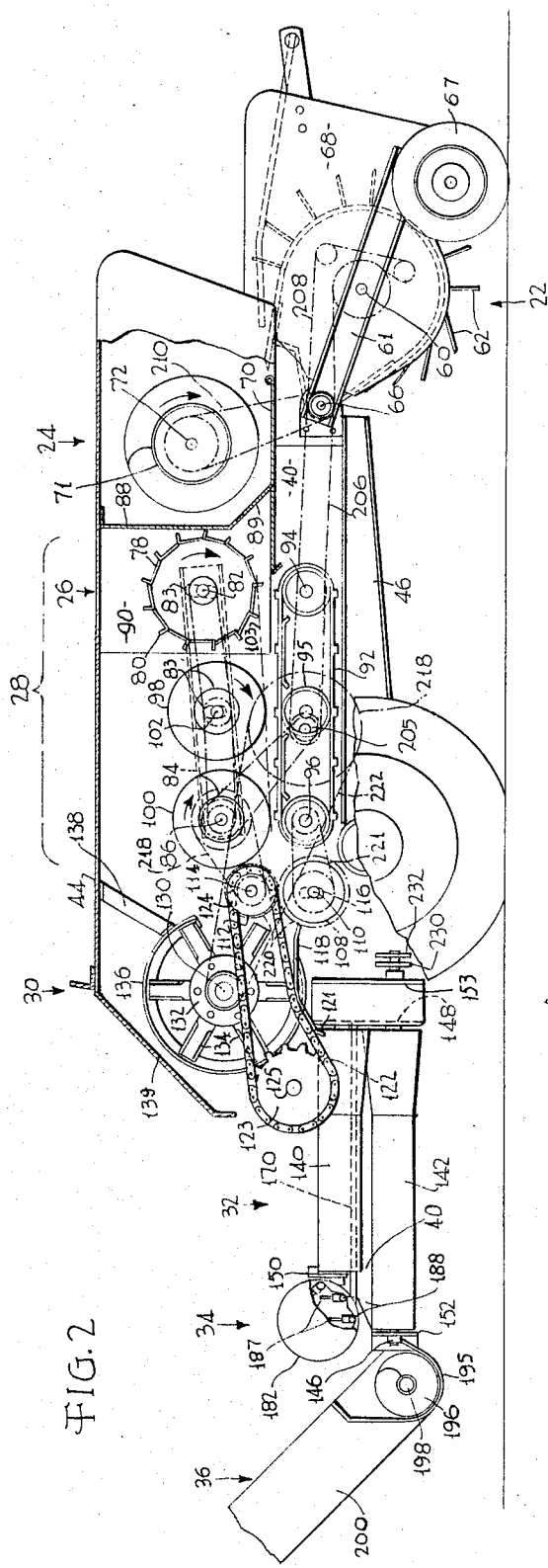
FIG. 2 is a partial vertical section taken on the line 2—2 of FIG. 1.

For greater ease of understanding and description we have separately generally designated the several intimately related mechanisms which comprise our machine as a whole and whose functions are closely inter-knit. Referring particularly to FIGS. 1 and 2 we have generally designated the chassis upon which the machine is built and carried by the numeral 20; the pick-up which delivers the hay from the field where it rests in the form mown or in a windrow form as 22; the immediately adjacent consolidating auger and the walls which co-act with it to feed the irregular mass of hay delivered by the pick-up to the following metering means as 24 (see FIG. 2); the prime metering roll and density unifying means and its co-acting walls as 26; this roll and an associated pair of metering means controlled feed distributing augers, and their associated underlying conveyor are collectively designated 28 (see FIG. 2 especially); the means for increasing the density of the hay distributed before the bank of units and the means for cutting it into equal portions and feeding these portions individually to the respective units of the bank we designate 30; the bank of hay roll forming units 32; the related pellet severing units 34; and the conveying means for the severed pellets 36; while the power drive system for these several inter-related units is designated generally 38.

The elements which constitute these mechanisms, their relationships to each other, and the remaining elements of the machine are cataloged as follows and accompanied in each case by a general statement of function.

The chassis 20 of the machine

40: This numeral designates longitudinally extending frame members. These serve not only on part as longitudinal elements of chassis but also as the sides of the machine housing as frames carrying the bearings of all transversely extending shafts having to do with the driving of transversely journalled elements of the several mechanisms, and as supports for such transverse frame members as are required to journal the rotated elements of the hay roll forming units of bank 32. Members 40 may be reinforced as found advisable. The right hand one of these frame members 40 has its forward end offset by a lateral extension 42 (FIG. 1), the better to accommodate a standard type pick-up mechanism 22 and the correspondingly elongated condensing auger 24 which initially acts upon the hay delivered by the pick-up to the machine. Using this offset 42 on the right side also enables driving connections from the power-take-off on the left side to the remaining mechanisms of the machine to be foreshortened, and improves the relation of the tractor draw bar to the machine as a whole. These latter points will become clearer when we come to describe further details of the chassis frame and the power transmission system 38. 44 is a housing top which partly covers the pick-up 22 and the bank of pelleting units 32, but completely covers the remaining mechanisms except 34 and 36.

46, 48, 50 and 52: These are respective chassis frame side sills, chassis frame transverse sills, chassis axle and wheels. Frame members 40 are mounted upon and secured to them by any suitable means. It is to be understood that there are two side sills 46, the one shown in plan in FIG. 1 and the other in side elevation in FIG. 2. The sills cross members and axle are welded together and the wheels mounted as usual at opposite ends of the axle. A draw bar 54 is pivoted at 56 to the intermediate cross member 48 and adapted to be adjustably connected to the foremost sill 48 through a series of bolt holes 58 as is common.

The pick-up mechanism 22

60, 61, 62, 64, 66 and 67: In order these numerals designate the transversely extending drive shaft of the pick-up, the oscillable pair of beams which journal this shaft, the tines, the stripper bars, the transverse drive shaft (66) upon which the pick-up as a whole is pivoted at the fore end of the machine and its ground running wheel 67. 68 designates the confining side walls of the pick-up, and numeral 70 (FIG. 2) applies to the hay receiving apron overlying shaft 66 and upon which the pick-up deposits the hay.

The hay consolidating means 24

71, 72, 74, 76 and 77 in the order recited refer to the mounting cylinder, the driving shaft, the left and right opposite hand flights of the large diametered and deep flighted auger 24, and the center line or plane of symmetry of the remaining mechanisms of the machine. Owing to the offset front portion 42 of the right hand side of the mounting side walls 40 of the machine the number of flights 76 of the consolidating auger on the right hand is greater than the number of opposite hand flights 74 on the left hand, for the auger revolves clockwise as viewed from the right as shown by the arrows and the flights co-act to consolidate and center the hay delivered by the pick-up toward and upon the center line 77 of the remainder of the machine. Each of the two flights terminates in the region of the center line 77 in a portion of markedly increased pitch designed to push the consolidated mass into the reach of the metering means 26.

Metering means per se 26

78, 80, 82, 84, 86, 88, 89 and 90 apply consecutively to the drum type metering roller 78 having peripheral feeding bars 80 and symmetrically placed with respect to center line 77, its vertically adjustable mounting shaft 82, mounting beams (84) external to the side walls 40, a fixed journal shaft 86 lying to the rear about which beams 84 are pivotally movable to admit of the vertical metering movement of roll 78 and the hay directing and confining walls 88 to 90 which symmetrically flank the drum. Like the consolidating means 24 the metering means per se, 78, 80, 82 coacts with the apron 70. The vertical confining walls 88 coact with both the consolidating means 24 through their foremost transversely extending portion 88 and its forwardly extended bottom 89, and with the metering drum per se 78 through their longitudinally extending inner portion 90 to move the metered hay toward and confine it near the plane of symmetry. Walls 88 to 90 are appropriately welded or otherwise secured into place onto side walls 40 of the housing, and portion 89 may be similarly welded or otherwise secured also to the apron 70, which in its turn is similarly secured to the side walls 40.

Metering and feeding means at large, 28

The mechanism of this means at large includes also the metering means per se described just preceding.

92, 94, 95, 96, 98 and 100 serially indicate an under running slatted feed conveyor, its several driving and supporting rollers, and the two redistributing augers which over lie the conveyor and coact therewith to distribute the hay metered by drum roller 78 and fed rearwardly by the conveyor 92. The advance auger 98 is driven by a shaft 102 which like the metering roll 78 is journalled in the adjustably pivoted beams 84. In this embodiment the pivotal shaft 86 of these beams also serves as the drive shaft of auger 100. Both the slatted conveyor and the distributing auger extend the full width of the bank of pelleting units 32 within the sides 40 of the housing. While the conveyor in its forward push has a top run substantially in the plane of apron 70 and coacts with the metering roll 78, the remaining reach of the conveyor coacts alone with augers 98 and 100. The ensemble of apron and conveyor constitute an underlying reacting table for the elements above them. To aid in these coactions the conveyor rollers 94, 95 and 96 are journalled fixedly in side frame 40 of the housing in substantially vertical planes which each includes one of the axes 82, 102 and 86 of the metering roll 78 and the augers 98 and 100. Slots 83 in flanking walls 40 are provided to permit the vertical movements of 82 and 102.

104, 106 of each auger are the flights of opposite hand on opposite sides of the plane of symmetry 77. Together they extend the full width of the bank of pelleting units 32 and meet in the plane of symmetry. These augers, 98 and 100, like the auger 24 and metering roll 26 revolve clockwise as viewed from the right hand side of the machine, but the direction of the flights are laterally outward instead of inward as are the flights of the consolidating auger 24. Accordingly they move the hay conveyed from the metering roll 78 laterally outwardly so thinning and spreading it before the bank 32. Moreover, the overall dimensions of the auger flights and the diameter of the metering roll 78 are substantially the same, with the result that the outer peripheries of these several elements when in engagement with the hay, engage it in a common generally horizontal plane 103 just above the conveyor 92. The result is that as the metering roll 78 rises and falls in its metering of the depth of cross section of the masses of hay passing beneath it, the advanced auger 98 is moved up and down proportionately to the area of the depth (and hence the area, for walls 90 are fixed) of the cross section metered so proportionately reducing its depth, and spreading it. The rearward auger 100 is always at a lesser distance from the top run of conveyor 92 and thus further spreads the hay and further thins it substantially uniformly before the bank of units 32, so long as the delivery rate of the pick-up is substantially the same.

*Condensing, cutting and feeding mechanism 30*

108, 110; and 112, 114 are respectively a lower feed and condensing roll and its drive shaft, and an upper and in this embodiment smaller diametered coacting feed and condensing roll, which receive and feed the spread of hay from mechanism 28 yet farther toward the pellet forming bank 32 than means 28. These rolls compress and increase the density of the spread hay as they further it toward bank 32. The lower roll 108 is provided with means for vertical movement with respect to the fixed upper roll 112, the movement is to be effected by any of the commonly known means (not shown) through the adaptability for such movement is indicated by slot 116 (FIG. 2) for shaft 110.

118, 120 and 121. Identified by these numbers are an upwardly convex feeding apron secured by suitable means not shown (commonly by welding) to the side frame members 40 of the machine housing; slots (FIG. 9) in its most convex surface intermediate the axes of the pellet forming units of the bank 32, and a down turned edge 121. This apron receives the condensed mat of spread hay from the condensing rollers 108 and 112.

122, 123 and 124 designate in turn individual chain conveyors, one to each unit and the respective rear and front sprockets over which the chains run. The bottom runs of these individual chain conveyors are deflected upwardly by the convexity of apron 118 as they feed hay over the apron. A single shaft 125 carries sprockets 123 and is journalled to run freely in bearings 126 (FIG. 1) in the housing side frames 40. The position of shaft 125 coupled with the relatively large diameter of sprockets 123 as such as to individually project the conveyors 122 and the portions of hay which they convey downwardly between the flanking fore-and-aft extending rollers 140 of the units. Sprockets 124 of the conveyor are the driving sprockets. They are accommodated in slots 128 in the body of the upper roll 112 of the pair of condensing rolls 108, 112 and may be affixed either in halves to the body of roll 112 if the roll is all in one piece, or if the roll is formed of axial sections may be keyed to the driving shaft 114 of the roll along with the corresponding sections. It is to be noted that the radius of the chain as it is run around sprocket 124 is very approximately the same as the radius of the roll 112, being shown but slightly less, though it may be of equal radius.

130, 132, 134: These numerals collectively refer to the cutting wheels constituting the means for severing the thinned and condensed cross sections into ribbons of equal width. 130 is the shaft upon which these wheels are drivingly mounted, which shaft like those of the other rotating elements are journalled in the sides 40 of the housing. 132 are the hubs and 134 is a series of equiangularly spaced cutting knives secured to the hub, and which as they revolve cut through the mat of hay fed by the individual conveyors 122. As they cut through they enter the slots 120 in the apron 118, thus effecting complete severance of the ribbons from each other. Accordingly each ribbon is free to be conveyed individually downwardly between the feeding and forming rolls 140 which flank conveyors 122. Individual annular guards for the cutting wheels are designated 136 and their individual supports from the top 44 are designated 138. The top 44 of the housing is provided with a downward rear extension 139 to effect partial coverage of mechanism 30 at large.

*The bank of hay roll forming units 32*

In addition to FIGS. 1 and 2 which show this bank of units, reference needs now be made also to FIGS. 3 and 8, and first to FIGS. 4 to 6.

This bank of units 32 heretofore termed to bank of hay roll pelleting units when so termed includes also the intimately related bank of pellet severing units 34 but for purposes of more ready reference and brevity the hay roll forming portion 32 of the bank will be described separately and beforehand.

140, 142, 144, 146, 148, 150 and 152: Consecutively the numbers 140 apply to a series of eight upper rolls in horizontal alignment, a coacting series 142 of seven lower rolls, the shafts 144 upon which the upper series is carried, the shafts 146 upon which the lower series is carried, 148 and 150 the front and rear transverse frame members supported from side walls 40 upon which the upper series is journalled, and 152 the rear transverse member also supported from the side wall 40 and which together with the lower portion of transverse member 148 journals the lower series of rolls 142. A fourth cross member 153 forward of the cross member 148, together with cross member 148 provides elongated journal support for the wrapping spindles 170 presently to be described.

154, 156 as applied to the corresponding axial portions of any one of the rolls 140 or 142 designate respectively the feeding and forming zone or portion of the roll and the firming and stabilizing portion. Rolls 140 and 142 are of identical dimensions except that rolls 142 are a bit longer. Portion 154 is conical in form with its base adjoining the journalling cross member 148 (see FIGS. 1 and 3 as well) while its smaller end extends rearwardly to conjoin the substantially cylindrical rearwardly extending firming and stabilizing portion 156. Each grouping of three rolls 140, 140 and 142 is mounted so that their parallel axes form an equilateral triangle. Thus their conical portions in zone 154 run tangential to a conical hay roll feeding and forming space having its largest end substantially of the desired pellet diameter, while their cylindrical portions of zone 156 run tangential to a substantially cylindrical hay roll firming space also of the desired and animal acceptable pellet diameter. This construction of the machine combined with continuous axial progression of the formed hay roll improves and perfects the geometry of the wrapping since hay turns wrapped about the forward end of each spindle are progressively being added to by other turns which are superimposed upon them as the forming hay roll progresses toward and into the firming zone 156. Combined with uniform feeding of each unit achieved through mechanisms 28 and 30 this results in a conical fore portion of the hay roll which enters the cylindrical firming space at a more nearly uniform spacial and radial density. The power required to initially form the roll and subsequently firm it is therefore markedly decreased.

158, 160, 162 and 164 indicate the means of yielding compression connection between the hollow bodies of rolls 140 and 142 with their mounting and driving shafts 144 and 146. 158 are inner and outer elastically annular connecting and yielding means between the inner periphery of the rolls at each end and the mounting shaft, such as the well known rubber rings vulcanized or forced in under compression. It is fixed in axial position by an inner stop ring 160 welded as at 161 to the roll but free of the shaft and an outer stop ring 162 free of the rolls but fitting closely upon the shaft and held against the rubber rings 158 by snap rings 164 upon the shaft.

166, 168: Respectively interacting positive driving means between shafts 144 and 146 and the rolls 140 and 142 adjoining the inner of the two connections 158. This connection supplements connections 158. One member 166 is welded to the roll body and projects radially inward toward the roll shaft a certain distance where it is flanked laterally by two members 168 welded to the driving shaft. These members afford a positive torque drive while permitting yielding radial movement of the rolls with respect to the shaft to the extent afforded by the radially elastic connecting rings 158. Such degrees of lost motion in all directions between members 166 and 168 are provided so as to enable the rings 158 to yield radially in all directions.

170, 171 and 172 (FIG. 3): Consecutively these point to elongated wrapping spindles and the inner and outer spaced journals in members 148 and 153 of each spindle at their driven ends. Their opposite ends 177 are free. They are located respectively upon the axes of the hay roll forming spaces and hence form the axes of the hay rolls wrapped about them.

173, 174, 175 and 176: Referring especially to FIGS. 7 and 8 it will be seen that these numbers apply serially to the hay roll progressing means 173 (the helical formation) which extends throughout the hay roll forming zone 154 (see FIG. 3) to an axially extending zone 174 (FIG. 8) of limited length throughout which zone the radius of the helical formation is progressively decreased while the spindle body diameter is complementally increased from the lesser diameter 175 of the body of the spindle within the forming zone 154, to the greater diameter 176 of the spindle within the firming zone 156. This construction prevents the slacking of the inner turns which would occur if the spindles were continued at diameter 175. Reference in particular to FIG. 3 will show that both the lower roll 142 of the three roll units and the spindles of the unit in a zone we have designated 179 extends several inches beyond the firming zone 156, but that the spindles 170 whose free ends are designated 177 are not extended as far as the ends of the rolls 142. While the relatively small scale of FIG. 3 as compared with the scale of FIGS. 7 and 8 precludes effectively showing the gradual decrease in radius of the helical formation 173 and the gradual increase of spindle diameter 175 to the diameter 176, we have shown the zone 174 on a large scale in FIG. 8. In FIG. 3 we indicate that part of zone 174 may lie in the forming zone 154 and part of it in zone 156. The precise location of this zone 174 depends upon design considerations and the number of full radius helical turns of the formation required to progress the hay roll under the chosen conditions of hay roll compression during the firming and the stabilizing operation being performed upon it in the firming zone 156, and the pellet severing operations which are performed in the zone 179 beyond zone 156.

178 and 180 respectively apply to the intermeshing driving pinions of the spindles 170 and the driving gears of each of the three rolls 140 and 142 which together with an associated spindle constitute a hay roll forming unit. Each of the upper tier of rolls 140 except the endmost one is a part of two three-roll units while each of the bottom tier 142 is a part of one such unit. Each spindle-borne pinion 178 drivingly meshes with the adjoining three roll driving gears 180 and thus the entire series of gears is inter-meshed and could, if desired, be driven by supplying power to but one spindle or any one of the shafts 144 or 146.

*The associated bank of pellet severing units 34*

Reference here is to be had generally to FIGS. 1 and 2 but more in detail to FIGS. 10 to 12. The bank 34 is comprised of a multiple number of units, one for each hay roll forming unit of the overall bank 32 of pelleting units. It can be seen by reference to FIGS. 1, 2 and 3, this bank 34 of pellet severing units operates in zone 179 of the main overall bank 32. There as the individual severing blades operate upon the hay rolls they become freed from the upper rolls 140 and are supported only by the extended lower rolls 142 and the free ends of the spindles 170. These latter, while they terminate short of the underlying rolls 142, are extended a considerable distance beyond the rear ends of rolls 140. In detail—

182, 184, 185 and 186 designate respectively for each pellet severing unit, a pair of cutting blade carrying discs, a detachably interconnecting hub 184 which spaces the pair of discs apart a distance approximately the diameter of the hay roll but preferably a greater distance as shown in FIG. 12, a hub axle in the form of a removable pin or bolt, and a U-shaped hub axle supporting bracket bolted to the rear face of the roll-bearing supporting member 150. Spacing washers 183 are provided between discs 182 and the inner faces of the bracket.

187, 188, 189: These refer in order to the equiangularly spaced swivelly mounted cutting blades of the units, their swivels in the pair of discs 182 and the inner swivel extension 189. The blades 187 are connected to swivels 188 either by extensions from their cutting edges or by the cutting edges themselves which are entered into slots (not shown) in swivel extensions 189 so located that the cutting edge E and the swivel axis A—A lie in each instance in the same plane. The blades are appropriately securel in the swivel slots by means of riveting, soldering, welding or the like (not shown) as may be preferred. The cutting edge E lies slightly above the axis of swivelling A—A (FIG. 11) whereby there is developed during the cutting operation a radial component serving to keep the blade in an erect position at right angles to the hay roll axis during its cutting operation.

190, stop pins midway between the swivels 188 which serve to confine the movement of the blades to within limits wherein the blades can be engaged and controlled by cam means (to be described) at the time they approach the start of their cutting operations.

191, 192 respectively designate substantially flat form axially outer extensions of the swivels 188. These constitute cam followers which successively engage with fixed cam or cams 193 and 194 secured to the inner faces of the arms of the U-shaped frame 186 between the arms and the blade mounting discs 182. 193 and 194 are curvilinearly elongated (see FIG. 10) and extended through an angular range sufficient to engage at one and the same time several of the swivel extensions 191, 192, the lowermost of which is the extension connected with that blade which is just about to enter the hay roll as clearly appears in FIG. 10. Its upper end and its main body are so curved as to gradually move the blades whose swivel extensions 191, 192 are engaged by the cam from a position at or near the stop pin 190 on the one side to the stop pin 190 on the opposite side whereby each blade as it enters the periphery of the hay roll shall occupy a position at right angles to the axis of the hay roll.

Given a required depth of cut from the outer periphery of the hay roll to the inner periphery created by the wrapping about spindle 170 and a desired axial dimension of the severed pellet, the radius at which the cutting edges lie from the center of the cutting wheel; the angle between the blades (and hence the number of the blades which are to be equiangularly spaced apart), and the width of the blade are chosen to effect the following geometric relationship between a blade edge $E^1$ which has just completed its cut and the next preceding and next succeeding blade edges $E^2$ and $E^3$. Planes joining the three cutting edges $E^1$, $E^2$ and $E^3$ form an isoceles triangle with each other (see FIG. 10) in the vertical plane of the axis of the hay roll. The base $E^2$, $E^3$ lies approximately tangent to the outer periphery of the hay roll, and the altitude is the depth of entry of the central blade $E^1$ which has completed its cut. This geometry ensures that but a single blade is entered into the body of the hay roll under cutting torque during the period required to sever each single pellet. It means moreover, that the axial length L of all severed pellets is always the same, to wit, one-half the length of the base of the isoceles triangle. Inasmuch as the planes connecting the cutting edge of the central blade of the three with the other two constitute continuously the hypotenuses of the right angle triangles whose one side is the shortest distance L between the parallelly extending blades, that side (the hypotenuse) as the depth of cut increases and the cutting wheel rotates, first decreases until its length is equal to the distance L between the successive cutting edges as the cut is completed, and then increases toward its initial dimension which is greater than the axial length L of the pellet after completion of the cut. Thus, there is no blade grasping action upon the pellets as they are severed, no pellet distortion, and no undue friction. The three blades $E^2$, $E^1$ and $E^3$ remain parallel and spaced apart the distance L during the complete severing operation of a pellet.

During this functioning the cutting wheel (which we may term the assemblage of elements thus discussed) is rotated by the thrust of the progressing hay roll itself against the blade engaged with it, even though but one blade only at a time is engaged in cutting operation. The thrust is over the whole body of the swiveled blade. Throughout the cutting operation the cuttingly engaged blade is reacted against not only by the body of the hay roll but also by the extended free end 177 of the spindle 170 and the underlying extended end of the lower forming roll or rolls 142. Because the end 177 of the spindle terminates just short of the vertical plane including such blade as it completes its cut and the axis of the cutting wheel, there is no interference of cutting edge and spindle body and the blade may cut all the way through and slightly beyond if desired.

*Product conveying and elevating mechanism 36*

This consists of a standard receiving trough 195 (FIG. 2) and its conveying auger 196 dependingly secured to the rearmost frame member 152 transversely of the bank of units 32 in position to receive the severel pellets as they drop from the lower rolls 142. The auger 196 is carried by a transverse shaft 198, and when rotated conveys the pellets to its one end, where there is located a pellet receiving elevator conveyor 200 for their delivery to a following wagon. This too is of a standard construction.

*The power transmission system 38*

Our machine is designed to receive its power by way of a power-take-off from the tractor which pulls it by means of the draw bar 54. The dash and dot line 202 extending to one of the two shafts which emanate from gear box 204 at right angles represents the power-take-off. The transverse one of these two shafts, that numbered 205, is the main drive shaft of the machine. Gear box 204 may be effectively anchored to a floor plate 206, which is in turn secured to the adjacent longitudinal and cross members 46 and 48 of chassis frame 20, or may be supported by individualized brackets or beams not shown but similarly connected. The additional elements of the system are the following.

207, the chain and sprocket drive from main shaft 205 to the pivoting and driving shaft 66 of pick-up 22.

208, the chain and sprocket drive for the pick-up and the under run of which is the driving run.

210, the chain and sprocket connection from drive shaft 66 to the consolidating auger drive shaft 72 of unit 24.

212, the chain and sprocket connection from main drive shaft 205 to the rearmost auger 100 of the feed distributing and thinning pair of augers 98, 100.

214 and 216, respectively the similar driving connections between augers 100 and 98 on the one hand and auger 98 and metering roll 78 on the other.

Chain drive 218 from auger 100 to roll 112. A set of gears 220 drive from 112 to 108 on shaft 110. Chain 221 then drives conveyor roll 96.

222, a step-up chain and sprocket driving connection from drive shaft 205 directly to the shaft 130 of the high speed ribbon cutting wheel.

A similar connection may be provided from any one of the fixedly rotating shafts for driving auger 196 of the pellet collecting and elevating system 36, though none is shown, for this does not enter into our invention.

The relative velocities and r.p.m. of the various rotated elements whose power connections have thus far been described we would have adjusted approximately as follows. The peripheral velocities of the pick-up, the metering roller 78, the conveyor 92, the condensing rolls 108 and 112 and the velocity of the individual feeding chains 122 should be approximately the same for the mass of hay picked up from the field or otherwise fed into the machine. The hay must be progressed through the machine in its entirety at the same linear velocity as picked up in order to avoid choking on the one hand or drag on the other. However, while the peripheral velocity or roll 78 need be adjusted to the peripheral velocities of the other elements named, the peripheral velocities of the several augers 71, 98 and 100 need be considerably higher, for the consolidating auger 71 needs to move the entire hay mass received laterally inwardly and before the metering roll 78 during the time of passage of the mass over the frontal portion of the apron, in order to complete its central consolidation before engagement of the mass by roll 78. The number of r.p.m. of auger 71 depends upon the number of helical turns required to so move it. Due to the offset 42 two and one-half complete turns of the right hand flight 76 are required whereas but one complete turn is required of the left hand flight 74. Because of slip and other inefficiencies this auger should have an r.p.m. of upwards of two and one-half. For the same reason the augers 98 and 100 should each have at least two complete revolutions to completely and substantially uniformly redistribute the metered mass of hay before the condensing rolls 108, 112 and the bank of pelleting units they serve. Again the r.p.m. need be slightly higher because of such inefficiencies as exist. In the case of augers 98 and 100 they must perform their respective functions, the auger 98 to distribute the mass approximately half way across the top of the underlying reacting conveyor in the time required by the conveyor to travel it from the mass beneath the metering roll 78 to beneath auger 198, while in the case of the auger 100 it is requisite that the mass be substantially uniformly distributed all the way across the top of the conveyor and to the sides 40 of the housing in the time required for the mass to be moved from the position beneath auger 98 to its full spread beneath auger 100.

224, 226, 228, 230 and 232, FIGS. 1, 2 and 3, refer respectively to a gear connection between the power-take-off and a longitudinally extending drive shaft 226; and a transverse chain and sprocket connection 228 (see FIGS. 3 and 4) to the left most spindle shaft, connection 230 from this shaft to the middle spindle shaft, and 232 to the right hand spindle shaft. By these means high speed driving connections are extended to the spindles at each of three points, and extended through the spindle pinions through the roll driving gears 180 throughout the entire series of wrapping spindles and coacting forming and firming rolls. By providing several spaced chain drives between spindles certain of the chains may be lighter than others, saving weight and cost and minimizing chain breakage. Additionally the aggregate back-lash between gears may be minimized.

The operation

The inter-related constructions and functionings of the several groups of mechanisms and their conjoining action have been set forth in such detail in the detailed description that description of the overall operation would appear unnecessary. As will have become apparent these inter-related constructions and functionings not only greatly improve the power economy and overall efficiency of the machine, but also very markedly improve the relative uniformity in physical dimensions of the product and their physical characteristics in general. The pellets produced will not only be of uniform dimension but will also be of greater density and uniformity of density, greater stability and durability of form, for any given moisture content at which one chooses to operate upon the hay.

Modifications

We expect that there will be modifications of our method and our machine without any departure from their generic spirit. Several such have already occurred to us, among them a further improvement in the metering and redistributing of the hay before the bank which we illustrate in FIGS. 13 and 14 and will describe immediately following, and several different arrangements of the pelleting units in bank in a common plane. These latter include the mounting of the parallelly extending bank of units in a vertically extending position, and the arranging of units to extend in radial relationship to each other and be driven from a common central shaft. In such radial relationship of the units the conical hay roll forming spaces may be defined by cylindrical roll portions while the cylindrical hay forming spaces in extension of the conical hay forming spaces are defined by roll portions of conical cross section.

Referring to FIGS. 13 and 14 depicting the modified metering and feeding: mechanisms which have corresponding functions are identified by the same numerals used in FIGS. 1 and 2. The modification consists in spacing the driving shafts 82, 102, 86 and 114 respectively of the metering wheel 78, the two augers 98 and 100 and the upper of the two condensing rolls 112, at the same distance (d) apart; by pivoting the bearing frame beams 84 in which these elements are journalled upon the fixed shaft 114 of roll 112; and by offsetting downwardly the pivoted ends of these beams so that the peripheries of each the metering wheel 78 and the augers 98 and 100 shall run tangent at all times (or substantially tangent) to a plane 236 which passes through the axis shaft 114 of roller 112. By thus equally dividing the total distance D between shaft 114 and shaft 82 the degree of spreading by augers 98 and 100 is inversely proportional to the radius of their respective axial distances from pivotal axis 114 to the total distance 3d between axis 82 and axis 114. Correspondingly the degrees of their thinning of the spread material are directly proportional to the ratios of their respective axial distances from axis 82 of the metering roll to the total distance 3d. Correlatively the width of the metered cross section between walls 90 needs be ⅓ the width of the spread achieved by auger 100 before the bank of pelleting units, and three times the thickness.

Plane 236 when no hay is being fed lies very close to the upper run of the conveyor 92 at but good clearance from it. As the varying volumes of hay are fed and metered by roll 78, the spreading and thinning operations are varied substantially in the proportions above outlined. Such a situation is illustrated in dotted lines where tangential plane 237 lies above the no-feed plane 236 but still passes through the axis of shaft 114.

Additionally in this modification we have somewhat differently organized the drive from main shaft 205 of the gear box 204 to the lower and upper condensing rolls 108 and 112. These rolls are respectively separately driven directly from shaft 205 by chain sprocket connections 238 and 240 (FIG. 13). The lower roll 108 is given the same diameter as the upper roll. Drive 218 to the conveyor from shaft 114 is retained. The longer drive chain 240 to the lower roll permits its relative vertical movement more readily. A narrow apron 242 is intervened between conveyor 92 at its rear and the condensing rolls 108, 112, but the conveyor may be extended rearwardly near these rolls, if desired to the proximity as illustrated in FIG. 2.

A substantial modification of the drives of the rolls of the bank of units 32 is illustrated in FIG. 15. It has to do with that feature of our invention designed to eliminate from between successive rolls of a unit of the peripheral slack occasioned by hay roll indentations made as the firming rolls exert their radial compression of the hay roll. We illustrate this by using a sprocket and chain drive 244, 246, 248 and 250 in which the chain 250 engages spindle drive sprockets 244 by its outer run, but roll borne sprockets 246 and 248 by its inner run. The rolls 140, 142 are all of the same diameter, but sprockets 248 are of lesser diameter than sprockets 246 whereby the lower rolls are run at a higher peripheral velocity than the upper rolls, so tending to straighten out the indentations made by the preceding rolls of the annular series comprising the unit. Such chain and sprocket drives are duplicated for each of the units, alternately in the one and then the other of adjacent parallel planes of drive, whereby all spindles and all rolls geared together, as in FIGS. 3 and 4.

The same end may be attained in the gearing drive system shown in FIGS. 3 and 4—merely by using two pinions of different size on each spindle, the larger of the two pinions driving smaller gears on the lower rolls 142 so imparting to them greater peripheral velocity, while the upper rolls 140 are driven from the smaller pinions such as 178. The larger pinion and the smaller gear are like the alternate chain drives located in adjacent parallel planes.

Yet other modifications of our invention both major and minor can and will doubtless be made by those designing and using machines of this type. All coming within the generic spirit of our invention should be held to be comprehended by our claims, quite irrespective of the fact that our present lack of knowledge of them may have resulted in our use of descriptive terms lacking in fullness of breadth.

We claim:

1. A machine for making cylindrically wrapped and compressed rolls of hay of pellet diameter comprising a rotatingly driven hay wrapping spindle adapted to wrap hay about itself turn by turn, which spindle has a bearing supported driven end and a freely extending discharge end, hay roll forming and hay roll firming means tangentially encompassing an elongated hay roll occupying space whose axes coincides with the axis of the spindle, the forming means adjoining the driven end of the spindle, and a hay roll propelling helical formation carried by the body of the spindle which originates in the zone of the forming means and extends over a determinate length of the spindle, the axial radius of the propelling formation being progressively decreased as the limit of its extension is approached while the radius of the spindle body is complementally increased in such manner as to maintain of the same length those turns of the wrapping which ultimately constitute the inner periphery of the hay roll.

2. A machine according to claim 1 in which the body of the spindle is continued of enlarged radius to its discharge end.

3. A hay pelleting machine comprising a frame, a multiple number of pelleting units arranged in bank side by side on said frame equidistant from each other, and means on said frame for feeding hay to be pelleted to said bank of pelleting units, said feeding means comprising means initially receiving the hay forwardly of said bank of pelleting units in masses of random form and of varying densities throughout, means on said frame rearwardly of said receiving means for consolidating the random masses from said receiving means into a relatively thick regular geometric form of meterable cross section and of densities approaching uniformity, means metering the cross section of said form rearwardly from said consolidating means, means rearwardly of said metering means and forwardly of said bank of pelleting units for changing the relatively thick metered form into a relatively thin form of substantially the same cross sectional area uniformly distributed before the bank of pelleting units, and means for feeding the thin cross section rearwardly in substantially equal parts to each of the pelleting units.

4. A machine according to claim 3 in which the said last named means is a means for cutting the thin cross section into ribbons of equal width and individually feeding each ribbon into an individual one of said pelleting units.

5. A machine according to claim 4 in which there is intervened between the means for thinning the metered masses and the means for cutting into ribbons means for increasing the density of the thinned masses.

6. A machine according to claim 4 in which a feed supporting and conveyor reacting apron underlies the individual ribbon feeding means, open spaces in said apron intermediate the individual feeding means, and the means for cutting the fed hay into ribbons comprises knives rotated upon an axis on the same side of said apron as the feeding means and entering said open spaces in the apron during their cutting operation.

7. A machine according to claim 3 in which the elements of each unit of the bank comprehends within itself a feed introduction space and the means for individually feeding each ribbon, itself enters the feed introduction space of its respective unit.

8. A machine for making cylindrically wrapped and compressed rolls of hay including a unit comprising a rotatable hay wrapping spindle adapted to wrap hay about itself and having a driven end and a freely extending discharge end, hay roll feeding and forming means arranged about said spindle for directing hay to and confirming its becoming wrapped about the spindle to constitute an elongated and compressed hay roll, said feeding and forming means encompassing a cone like space about said spindle adjoining the driven end of the spindle, said cone like space having its larger end toward the discharge end of the spindle, said feeding and forming means comprising a plurality of hollow tapered rollers whose peripheries tangentially encompass the aforesaid cone like space and whose larger diameter ends adjoin the driven end of the spindle, each of said hollow rolls being borne on individual driving shafts with which they have two connections, the one an annular and radial yielding connection, and the other a positive driving connection having radial lost motion, means other than the said feeding and forming means for exerting a controlling axial force upon the formed hay roll to move it along the spindle toward the discharge end, and means for transaxially subdividing the elongated cylindrical hay roll into pellet lengths.

9. A machine according to claim 8 comprising a multiple number of such units in side by side relation, and in which units there are provided cylindrical extensions of said hollow rollers on the same axis, provided with individual driving shafts with which they have internal yielding driving connections, the means for moving the hay roll along the axes comprises spindles having helical formations merging gradually into enlarged spindle bodies, for receiving hay in irregular form, means for regularizing and metering the column of hay as delivered, means controlled from said metering means to distribute the metered hay uniformly before said bank of units, means for condensing the hay so distributed, means for cutting the condensed hay into ribbons one individual to each unit, individual means feeding such ribbons into feed receiving spaces within the units, and means individual to each unit powered by the axial movement of the hay roll comprising a rotating annular series of cutting blades cuttingly engaging the hay roll one blade at a time for each pellet cut from the roll.

10. A machine for making cylindrically wrapped and compressed pellets of hay of fixed diametral and axially dimensions comprising an elongated wrapping spindle supported at one end and having an opposite free end, a tangentially encompassing annular series of forming and compressing rolls for cylindrically wrapping the hay turn by turn about the central axis of said spindle and radially compressing it into an elongated hay roll of the fixed pellet diameter about the same axis, means axially progressing the cylindrical hay roll as it is formed and compressed, transaxial pellet length metering and cutting means powered by the progression of the hay roll itself and cuttingly engaging the hay roll at the fixed length only from its most advanced end and inwardly of said spindle free end, said cutting means being projected in a direction across said hay roll and when at full cutting depth being directly adjacent to and axially spaced beyond said spindle free end, whereby the cutting means may begin its cut with a force directed against said spindle and complete the cut beyond the spindle free end and without engaging the spindle while the pellet being cut continues to revolve and be supported in line with the hay roll until completely severed.

11. A machine according to claim 10 in which the metering and cutting means comprises a cutting wheel frame mounted to be revolved upon a transaxial bearing radially removed from the hay roll, said cutting wheel frame carrying an annular series of cutting blades equiangularly spaced at such an angle that one blade only at a time can cuttingly engage the hay roll, and said blades being transaxially swiveled on axes near their cutting edges to permit the main bodies of the blades to remain in planes normal to the hay roll axis at all times during their engagement with the hay roll.

12. A machine according to claim 11 in which cutting blade stops are provided preventing the under blades flopping about their swivels when in disengagement from the hay roll, in combination with means to move each blade into a plane normal to the hay roll axis with its cutting edge foremost as it nears cutting engagement.

13. A machine according to claim 11 in which the blade swiveling axes are substantially parallel to their cutting edges but lie sufficiently above them to introduce a vertical uprighting movement upon the blade as a whole.

14. A machine according to claim 11 in which there are provided positive means to orient the blades in a plane normal to the axis of the hay roll before they enter upon the cutting in the form of a fixed cam adapted to move the blades about the axes of their swivelling.

15. A machine according to claim 10 in which the said cutting means consists of an annular series of cutting blades which are each swivelly mounted in line with its cutting edge in a rotatable frame and spaced apart at such an angle that when any blade reaches maximum depth of cut there is found a right triangle whose hypotenuse is a line connecting the cutting edge of the full depth blade and that of the next succeeding blade, and whose two sides occupy respectively the periphery of the severed pellet and the body of the full depth blade.

16. A hay pelleting machine comprising the combination of a mobile frame adapted to travel forwardly over the ground, means on said frame to pick up hay from the ground and deliver it rearwardly, means on said frame rearwardly of said pickup means to receive hay from the pickup means and consolidate it into a relatively narrow mass, means on said frame rearwardly of said consolidating means to compress said mass into a ribbon of hay of relatively uniform density throughout its cross section and meter said ribbon rearwardly, means on said frame rearwardly of said compressing and metering means to distribute said ribbon into a relatively wide thin layer of hay and to feed said layer rearwardly, means on said frame rearwardly of said distributing means to sever said layer of hay into a plurality of rearwardly moving strips, and a plurality of pelleting units carried by said frame rearwardly of said severing means to respectively receive said strips of hay and form said strips into pellets.

References Cited

UNITED STATES PATENTS

| | | | |
|---|---|---|---|
| 961,997 | 6/1910 | Ball et al. | 100—86 |
| 963,775 | 7/1910 | Killman | 100—78 |
| 3,030,876 | 4/1962 | Searles | 100—98 |
| 657,028 | 8/1900 | Pace | 100—89 X |
| 659,342 | 10/1900 | Bessonette | 100—40 |
| 963,823 | 7/1910 | Spoon | 100—82 |
| 983,086 | 1/1911 | Reagan | 100—86 X |
| 1,213,284 | 1/1917 | Slathar. | |
| 1,968,310 | 7/1931 | Peterson. | |
| 2,313,102 | 3/1943 | Taylor | 100—89 X |
| 2,367,911 | 1/1945 | Wells. | |
| 2,629,341 | 2/1953 | Rice | 83—308 |
| 2,716,318 | 8/1955 | Skromme | 56—1 |
| 2,893,308 | 6/1958 | Bodisch | 100—86 X |
| 532,749 | 1/1895 | Banister | 100—172 X |
| 799,175 | 9/1905 | Luebben | 100—79 X |
| 1,834,466 | 12/1931 | Mackenzie | 100—172 X |
| 2,800,217 | 7/1957 | West | 56—364 X |
| 3,191,366 | 6/1965 | Molitorisz | 56—1 |
| 2,207,795 | 7/1940 | Grimm. | |
| 3,244,088 | 4/1966 | Bushmeyer et al. | 100—89 |
| 3,269,098 | 8/1966 | Bushmeyer et al. | 56—1 |
| 3,316,694 | 5/1967 | McColly et al. | 100—89 X |
| 3,323,445 | 6/1967 | Bushmeyer et al. | 100—86 |

FOREIGN PATENTS

| | | |
|---|---|---|
| 1,130,049 | 9/1956 | France. |
| 106,211 | 11/1899 | Germany. |

BILLY J. WILHITE, *Primary Examiner.*